(12) United States Patent
Harada (10) Patent No.: US 9,720,517 B2
(45) Date of Patent: Aug. 1, 2017

(54) CHARACTER INPUT APPARATUS

(71) Applicant: CANON KABUSHIKI KAISHA, Tokyo (JP)

(72) Inventor: Sayaka Harada, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 351 days.

(21) Appl. No.: 14/580,155

(22) Filed: Dec. 22, 2014

(65) Prior Publication Data

US 2015/0186001 A1 Jul. 2, 2015

(30) Foreign Application Priority Data

Dec. 27, 2013 (JP) ................................. 2013-272046

(51) Int. Cl.
- *G06F 3/0484* (2013.01)
- *G06F 3/023* (2006.01)
- *H04N 1/00* (2006.01)
- *G06F 3/0489* (2013.01)

(52) U.S. Cl.
CPC .......... *G06F 3/023* (2013.01); *G06F 3/04842* (2013.01); *G06F 3/04892* (2013.01); *H04N 1/0048* (2013.01); *H04N 1/00411* (2013.01)

(58) Field of Classification Search
CPC .................................................. G06F 3/04842
USPC ....................................................... 715/780
See application file for complete search history.

(56) References Cited

U.S. PATENT DOCUMENTS

| | | | | |
|---|---|---|---|---|
| 6,378,087 B1 * | 4/2002 | Flanagan | ............ | G06F 11/3672 714/38.1 |
| 6,535,883 B1 * | 3/2003 | Lee | ........................... | G06F 9/44 707/694 |
| 7,137,100 B2 * | 11/2006 | Iborra | ....................... | G06F 8/30 717/104 |
| 8,312,660 B1 * | 11/2012 | Fujisaki | ................... | F41A 17/08 42/70.01 |
| 8,589,817 B2 * | 11/2013 | Fukimoto | ........... | G06F 3/04895 715/744 |
| 9,043,893 B1 * | 5/2015 | Benson | ................. | H04L 63/029 726/11 |

(Continued)

FOREIGN PATENT DOCUMENTS

JP 59-3616 A 1/1984

OTHER PUBLICATIONS

S. Cheshire, M. Krochmal, Apple Inc. Internet Engineering Task Force (IETF) Request for Comments: 6763 Category Standards Track ISSN: 2070-1721 [online] Feb. 2013.*

(Continued)

*Primary Examiner* — Reza Nabi
(74) *Attorney, Agent, or Firm* — Canon USA, Inc. I.P. Division (57) ABSTRACT

Included is an instruction unit configured to instruct input of a character as a part of a character string; and a control unit configured to, under a restriction that any of a specific character group is allowed to be input in neither of a plurality of predetermined positions of the character string, upon any of the specific character group being instructed by the instruction unit to be input in at least one specific position of the plurality of predetermined positions, prohibit input by the instruction and, upon any of the specific character group being instructed by the instruction unit to be input in a position different from the specific position, enable input by the instruction.

30 Claims, 8 Drawing Sheets

(56) References Cited

U.S. PATENT DOCUMENTS

| | | | |
|---|---|---|---|
| 9,286,283 B1* | 3/2016 | Wilczek | G06F 17/243 |
| 9,317,189 B1* | 4/2016 | Chen | G06F 3/0484 |
| 2004/0024842 A1* | 2/2004 | Witt | G06F 17/243 |
| | | | 709/219 |
| 2004/0044791 A1* | 3/2004 | Pouzzner | G06F 17/22 |
| | | | 709/245 |
| 2005/0108624 A1* | 5/2005 | Carrier | G06F 17/2725 |
| | | | 715/221 |
| 2009/0019313 A1* | 1/2009 | Pokala | G06F 9/4443 |
| | | | 714/37 |
| 2009/0019545 A1* | 1/2009 | Ben-Itzhak | G06F 21/54 |
| | | | 726/23 |
| 2009/0132950 A1* | 5/2009 | Gibson | G06F 17/2725 |
| | | | 715/780 |
| 2010/0125762 A1* | 5/2010 | Nie | G06F 17/2725 |
| | | | 714/49 |
| 2012/0253920 A1* | 10/2012 | Yarvis | G06Q 30/0241 |
| | | | 705/14.41 |
| 2015/0089345 A1* | 3/2015 | Marimuthu | G06F 17/243 |
| | | | 715/221 |
| 2015/0186001 A1* | 7/2015 | Harada | G06F 3/023 |
| | | | 715/780 |
| 2016/0330776 A1* | 11/2016 | Ren | H04W 48/16 |

OTHER PUBLICATIONS

S. Cheshire, M. Krochmal, Apple Inc. Internet Engineering Task Force (IETF) Request for Comments: 6763 Category: Standards Track ISSN: 2070-1721 [online] Feb. 2013 [searched on Dec. 12, 2013], Internet <URL: http://www.ietf.org/rfc/rfc6763.txt>.

* cited by examiner

CHARACTER INPUT APPARATUS

BACKGROUND OF THE INVENTION

Field of the Invention

The present invention relates to a method for inputting characters when a restriction of characters that can be input is placed on a plurality of positions of a character string.

Description of the Related Art

A camera, smartphone, or the like records captured image information as a digital data file in a recording medium, such as a memory card, that has been incorporated in or attached to the device. The digital data is transmitted and received via a connection with another device using wireless communication. It is also possible to connect a digital camera or smartphone to the Internet, and post a captured image on a Web service such as a photo posting service or cloud service. Upon use of such wireless communication, it is necessary to set a nickname, in addition to a verification number, for each device. Moreover, a user can set the nickname for the device.

Japanese Patent Application Laid-Open No. S59-3616 proposes an input prohibited character display method in which an input prohibited character string table is held, a character code is checked at every key input upon input of data, and a prohibited character declaration is output in a case of an input prohibited character string.

S. Cheshire, M. Krochmal, Apple Inc. Internet Engineering Task Force (IETF) Request for Comments: 6763 Category: Standards Track ISSN: 2070-1721 [online] February 2013 [searched on Dec. 12, 2013], Internet <URL: http://www.ietf.org/rfc/rfc6763.txt> (described in 6.5. Rules for Values in DNS-SD Key/Value Pairs "The value MUST NOT be enclosed in additional quotation marks or any similar punctuation; any quotation marks, or leading or trailing spaces, are part of the value.") describes a specification on mDNS's communication protocol in RFC (Request For Comments) 6763. In the above-mentioned specification, any of a specific character group is prohibited from being used in both first and last character positions of a nickname to be communicated via wireless communication. Hence, the user needs to set a nickname in compliance with the above-mentioned specification.

In the above-mentioned Japanese Patent Application Laid-Open No. S59-3616, a character code is checked at every key input upon input of data. Accordingly, if the input character is the input prohibited character string regardless of the position in the sequence of the character string, the prohibited character declaration is output. Hence, although a nickname in compliance with the specification of RFC is input, it may output the use of the prohibited character. Moreover, a specification that restricts the kinds of characters to be input in predetermined sequence positions in such a specific character string may be newly established.

SUMMARY OF THE INVENTION

Considering the above problems, an object of the present invention is to provide a character input apparatus that has improved a user's operability in the input of characters in compliance with a restriction that any of a specific character group cannot be input in a specific position.

A character input apparatus includes: an instruction unit configured to instruct input of a character as a part of a character string; and a control unit configured to, under a restriction that any of a specific character group is allowed to be input in neither of a plurality of predetermined positions of the character string, upon any of the specific character group being instructed by the instruction unit to be input in at least one specific position of the plurality of predetermined positions, prohibit input by the instruction and, upon any of the specific character group being instructed by the instruction unit to be input in a position different from the specific position, enable input by the instruction.

A character input apparatus includes: an instruction unit configured to instruct input of a character as a part of a character string; and a control unit configured to, under a restriction that any of a specific character group is allowed to be input in neither of a plurality of predetermined positions of the character string, upon any of the specific character group being instructed by the instruction unit to be input in at least one specific position of the plurality of predetermined positions, issue a warning and, upon any of the specific character group being instructed by the instruction unit to be input in a position different from the specific position, enable input by the instruction.

A character input apparatus includes the control unit according to a first aspect of the invention, wherein the character string is a character string to be input in compliance with a specification of Request For Comments.

A character input apparatus includes the control unit according to the first aspect of the invention, wherein the specific position is a first position of the plurality of predetermined positions.

A character input apparatus includes: an instruction unit configured to instruct input of a character as a part of a character string; and a control unit configured to, under a restriction that a specific combination of characters is not allowed to be input in a plurality of predetermined positions of the character string, upon the character included in the specific combination being instructed to be input in one specific position of the plurality of predetermined positions of the character string, prohibit input by the instruction and, upon any of the characters included in the specific combination being instructed by the instruction unit to be input in a position different from the specific position, enable input by the instruction.

A character input apparatus includes: an instruction unit configured to instruct input of a character as a part of a character string; and a control unit configured to, under a restriction that a specific combination of characters is not allowed to be input in a plurality of predetermined positions of the character string, upon the character included in the specific combination being instructed to be input in one specific position of the plurality of predetermined positions of the character string, issue a warning and, upon any of the characters included in the specific combination being instructed by the instruction unit to be input in a position different from the specific position, enable input by the instruction.

Further features of the present invention will become apparent from the following description of exemplary embodiments (with reference to the attached drawings).

DESCRIPTION OF THE EMBODIMENTS

An exemplary embodiment of the present invention will be described in detail below with reference to the accompanying drawings.

It is to be noted that the following exemplary embodiment is merely one example for implementing the present invention and can be appropriately modified or changed depending on individual constructions and various conditions of apparatuses to which the present invention is applied. Thus, the present invention is in no way limited to the following exemplary embodiment.

<[Exemplary Embodiments of the Present Invention]>

Hereinafter, the exemplary embodiments of the present invention are described in detail with reference to the accompanying drawings.

[First Embodiment]
<Hardware Configuration>

Figure 1A:
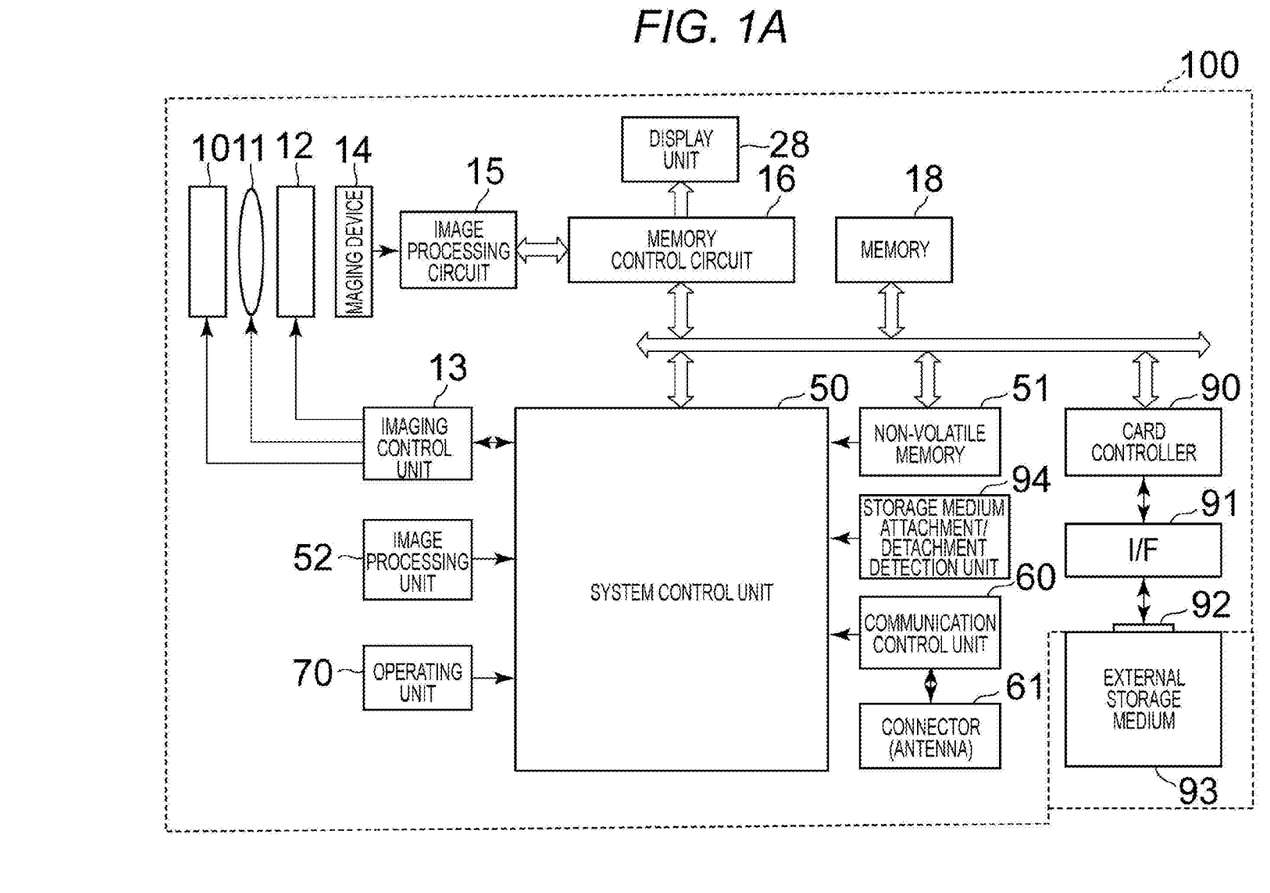
FIGS. 1A and 1B are diagrams illustrating a configuration example and external view of a digital camera as an example of an apparatus to which a configuration of the embodiment can be applied.

FIG. 1A is a diagram illustrating a configuration example of a digital camera 100 as an example of an apparatus to which a character input apparatus according to the embodiment can be applied. For example, what is called a mobile phone terminal with a camera (also including a device generally called a smartphone), a tablet device, or the like may be used as the character input apparatus.

A lens barrier 10, a photographic lens 11, and a shutter 12 including a diaphragm function are controlled by an imaging control unit 13. An imaging device 14 is a CMOS image sensor or CCD image sensor that converts an optical image into an electrical signal. An image processing circuit 15 performs image processing such as a pixel interpolation process and an image conversion process on data from the imaging device 14 or data from a memory control circuit 16.

The memory control circuit 16 writes the image data output by the image processing circuit 15 into a recording medium such as a memory 18. A display unit 28 is a display such as a liquid crystal display on which D/A converted image data for display, which has been written into the memory 18, is displayed.

The memory 18 is used to store captured still and moving images and has a sufficient storage capacity to store a predetermined number of still images and a moving image of a predetermined time. Hence, also in cases of continuous shooting and panoramic shooting for shooting a sequence of still images, a large amount of images can be written into the memory 18 at high speeds. Moreover, the memory 18 can also be used as a working area of a system control unit 50.

The system control unit 50 executes various processes necessary in the embodiment, such as an object recognition process of a captured image, a check process between the object recognition result and management data, and a status data generation process, and controls the entire digital camera 100. The system control unit 50 includes a CPU, a RAM and a ROM, and loads a control program stored in the ROM into the RAM to execute the control program by the CPU. Accordingly, the operation of the digital camera 100 is achieved. A non-volatile memory 51 can store constants, variables, programs, and the like for the operation of the system control unit 50.

An image processing unit 52 performs various image processing such as a resizing process of a still image. A communication control unit 60 is connected to an antenna 61 and controls a function of wireless communication with an external device. An operating unit is an input device group with which a user inputs various operation instructions into the digital camera 100, and includes one or more various input devices such as a switch, a button, a dial, a touch panel, eye-pointing by eye-gaze detection, and an audio recognition device.

A card controller 90 transmits and receives data to and from an external storage medium 93 such as a memory card. An interface (I/F) 91 is an interface in between with the external storage medium 93 such as a memory card. The external storage medium 93 such as a memory card can be attached to a connector 92. The external storage medium 93 is a detachable storage medium such as a memory card. A storage medium attachment/detachment detection unit 94 detects whether or not the external storage medium 93 is attached to the connector 92.

Figure 1B:
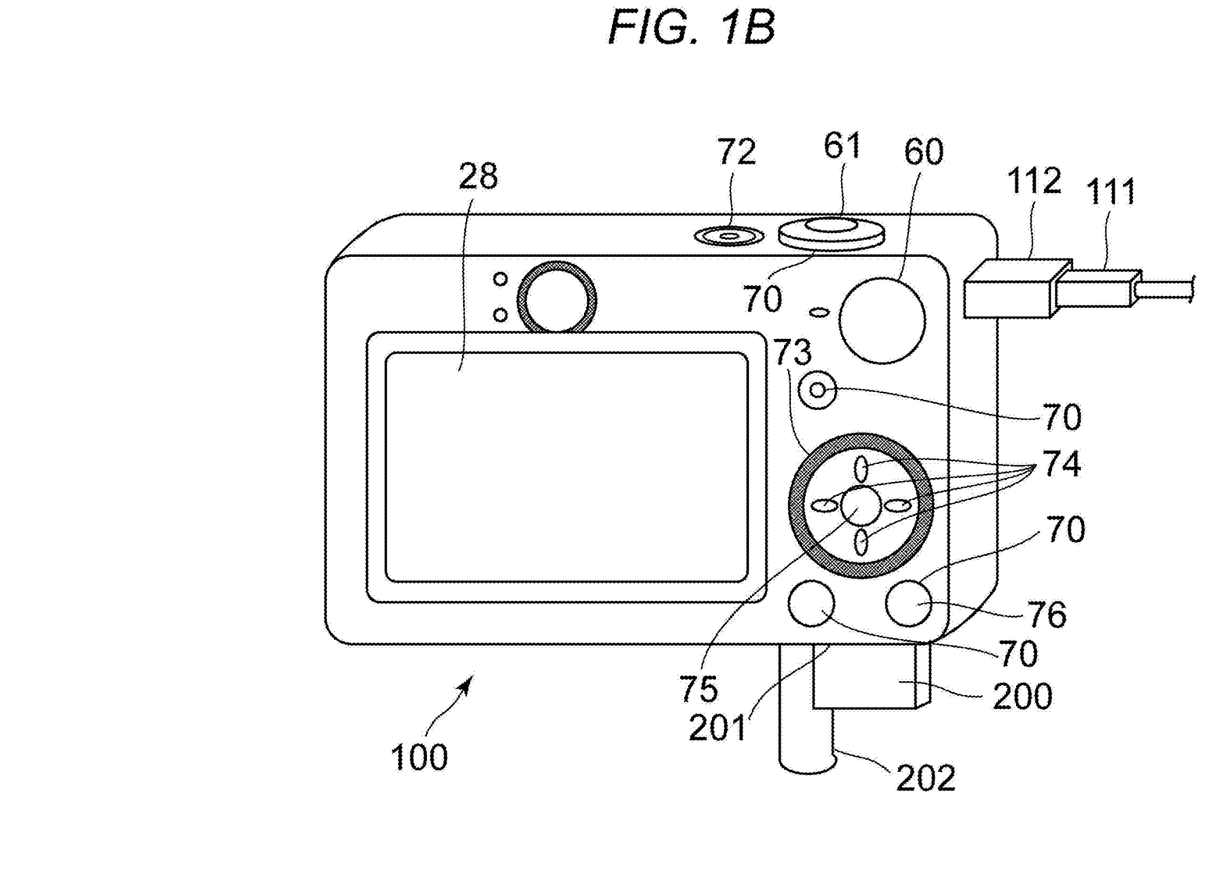

FIG. 1B is a diagram illustrating an external view of the digital camera 100 as an example of an apparatus to which the character input apparatus according to the embodiment can be applied. The display unit 28 is a display unit that displays images and various pieces of information. The operating unit 70 illustrated also in FIG. 1B is an operating unit including various operating members such as a switch, a button, and a touch panel that accept various operations from the user. A controller wheel 73 is an operating member capable of a rotation operation and included in the operating unit 70, and can move a selection frame 507 described below, feed an image, and the like. A cross key 74 is included in the operating unit 70, and is a cross key (four-direction key) where up, down, left, and right portions can be pressed, respectively. An operation corresponding to the pressed portion of the cross key 74 can be performed. A SET button 75 is included in the operating unit 70, and is a press button used mainly for things such as a decision of a selected item. A MENU button 76 is included in the operating unit 70, and is used mainly for displaying a setting menu screen and as a return button.

<List of Characters to be Input>

Figure 2:
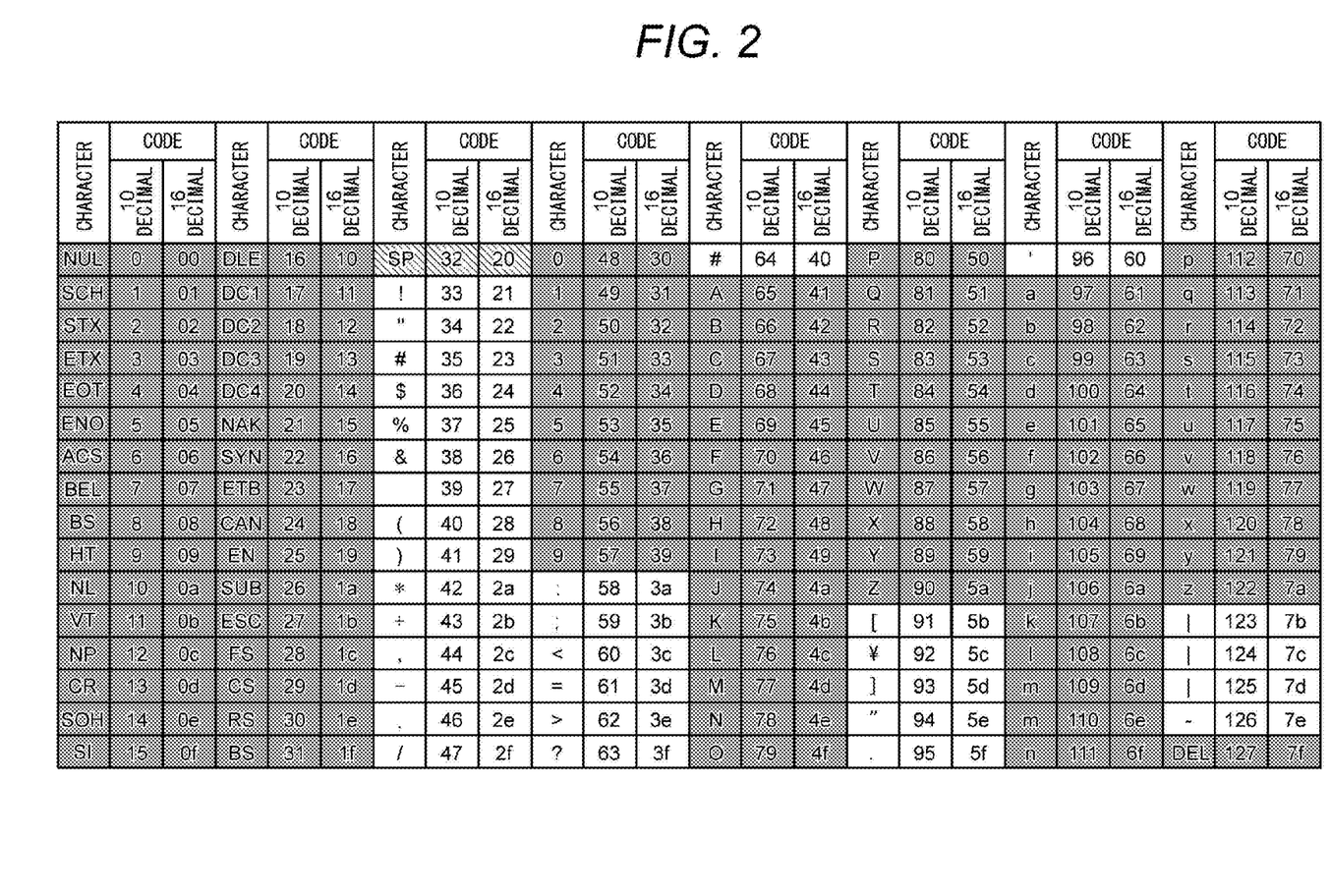
FIG. 2 is a table illustrating characters whose use is restricted and characters that can be freely used in ASCII codes according to the embodiment.

FIG. 2 is a list of characters that can be used by the digital camera 100 according to the embodiment, the characters including those having a restriction on a position to be input (a position in the sequence of a character string) as a nickname in wireless communication, and those having no restriction on a position to be input. Characters shown in open frames are characters (predetermined symbols) defined as characters having a restriction on a position to be input. A character shown in a hatched frame is a character having no restriction on a position to be input as a nickname in RFC (Request For Comments), but is a character (space) having a restriction on a position to be input to prevent the user's operation error. Characters filled with gray are characters (including letters and digits) having no restriction on a position to be input. In the embodiment, the symbols and space shown in the open frames and the hatched frame are set as a specific character group on which a restriction is placed on a position to be input.

In the specification of a character string in RFC, even if the leading (first) and trailing (last) characters of the character string are not characters of the same kind, the characters shown in the open frames in FIG. 2 can be used in neither of the leading and trailing positions of the character string. Hence, in the embodiment, control is performed such that a nickname where a symbol or space has been input for the first character is not confirmed. This is because unless the first character is any of the specific character group where a restriction is placed on use, it is not against the specification of RFC that states neither of the leading and trailing positions must contain any of the specific character group.

<Wireless Connection>

Figure 3:
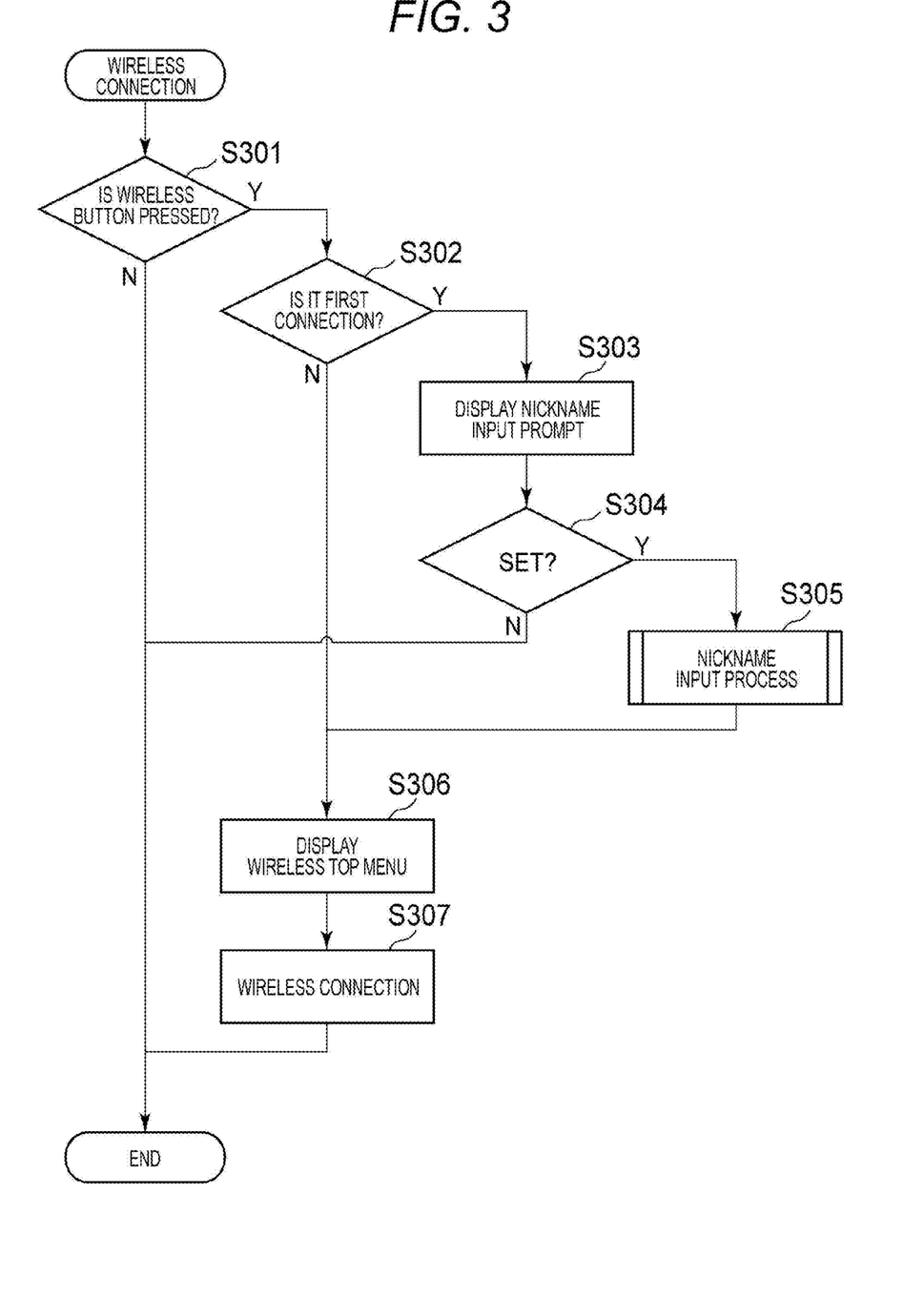
FIG. 3 is a flowchart illustrating the flow of the setting of a nickname upon first wireless connection of the digital camera according to the embodiment.

A description is given of the flow of a wireless connection process according to the embodiment with reference to FIG. 3. In the embodiment, a character located in the first character position is determined if a character is instructed to be input for the first character of a nickname and if confirmation of the nickname is instructed. FIG. 3 illustrates a process to be performed during playback of a captured image. The system control unit 50 executes the program stored in the non-volatile memory 51 by reading the program into the memory 18. Accordingly, the process is achieved.

In step S301, the system control unit 50 determines whether or not a Wi-Fi button (wireless button) has been pressed. If it is determined that the wireless button has been pressed, execution proceeds to step S302 and, if not, the process is ended.

In step S302, the system control unit 50 determines whether or not it is a first wireless connection. If it is determined to be a first connection, execution proceeds to step S303 and, if not, proceeds to step S306.

In step S303, the system control unit 50 causes the display unit 28 to display a nickname input prompt. Here in step S304, it is determined whether or not the SET button 75 included in the operating unit 70 has been pressed. If it is determined that the SET button 75 has been pressed, execution proceeds to step S305 and, if not, the process is ended.

In step S305, the system control unit 50 proceeds to a nickname input process. The nickname input process is described later in FIG. 4.

On the other hand, in step S306, the system control unit 50 displays a wireless top menu. Furthermore, in step S307, a wireless connection is established.

<Input of Nickname>

Figure 4:
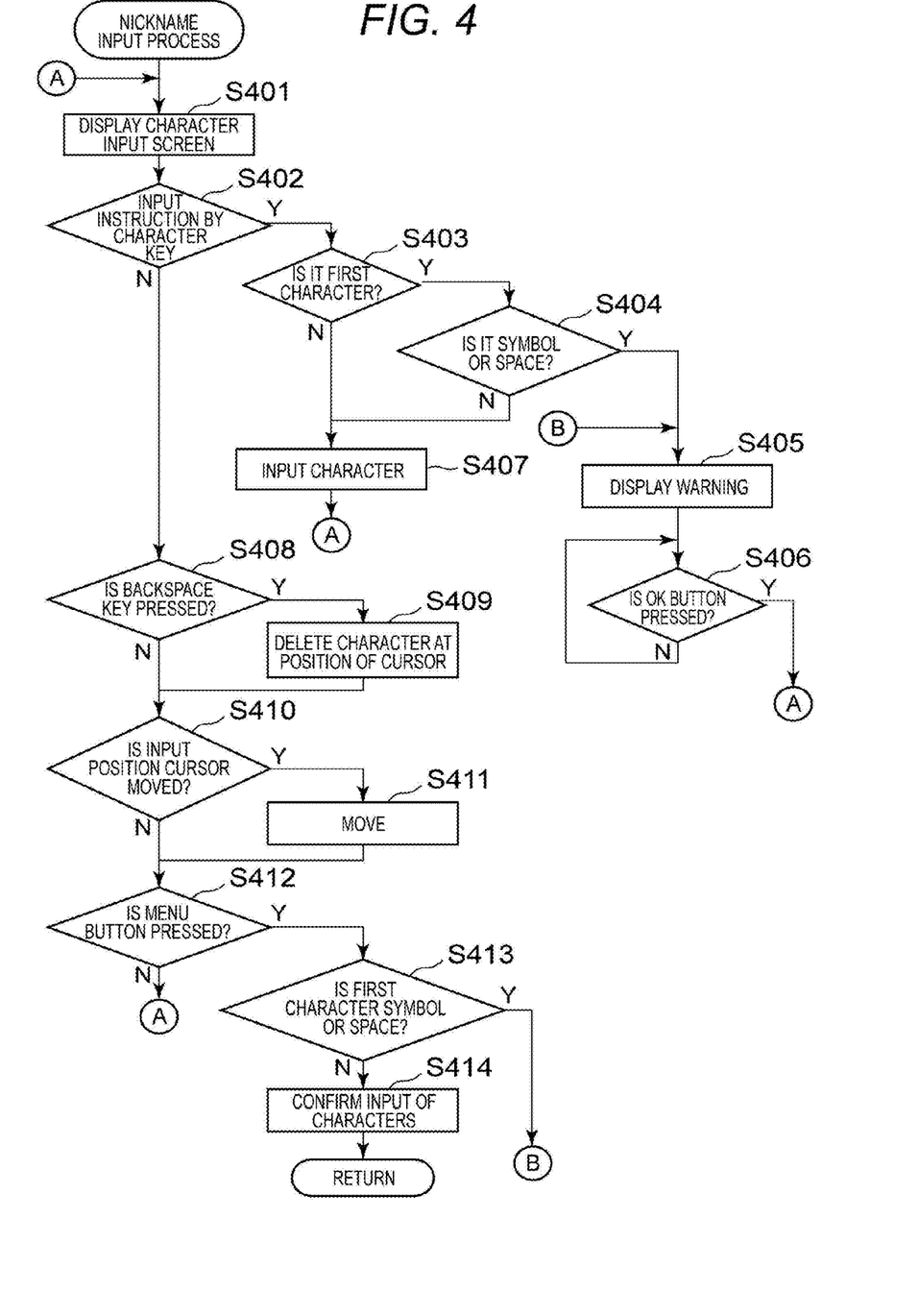
FIG. 4 is a flowchart illustrating the flow of a nickname input process according to the first embodiment.

A description is given of the flow of the above-mentioned nickname input process in step S305 of FIG. 3 with reference to FIG. 4.

Figure 5A:
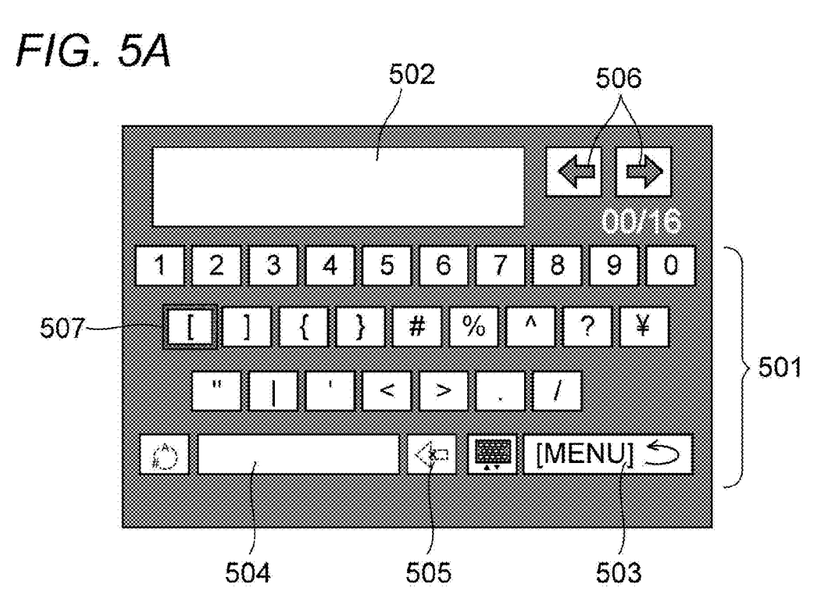
FIGS. 5A and 5B are a character input screen and error screen of the digital camera according to the embodiment, respectively.

In step S401, the system control unit 50 displays, on the display unit 28, an input screen that allows the user to input a nickname. FIG. 5A illustrates a display example of the character input screen. A keyboard 501 is displayed on the character input screen to enable the user to instruct the input of a character as a part of a character string. Moreover, if a space input key 504 is pressed, the input of a space can be instructed. The user uses the four-direction key of the cross key 74 and the controller wheel 73 to change the position of the selection frame 507, and presses the SET button 75 and accordingly can instruct the input of a character. The character being present in the selection frame 507 when the SET button 75 is pressed is a character instructed to be input. The display of the character instructed to be input in an already-input character string display field 502 (display control) indicates that the character has been input. The character string here indicates characters including one or a plurality of input characters. Moreover, the user operates an input position cursor key 506 and accordingly can change the position in which a character is instructed to be input. If a backspace key 505 is pressed (a selection is made using the selection frame 507 to press the SET button 75), a character located before the cursor in the already-input character string display field 502 can be deleted. If a menu key 503 is pressed, the input character string can be instructed to be confirmed as a nickname. At this point in time, whether or not to be confirmed as a nickname is described later in step S412. Moreover, in the character input operation, a case where the MENU button 76 is pressed is also similar to the case where the menu key 503 is pressed.

In step S402, the system control unit 50 determines whether or not input has been instructed by a key on the keyboard. If it is determined that input has been instructed, execution proceeds to step S403 and, if not, proceeds to step S408.

In step S403, the system control unit 50 determines whether or not the position in which a character has been instructed to be input is a first character position. If it is determined to be the first character position, execution proceeds to step S404 and, if not, proceeds to step S407.

In step S404, the system control unit 50 determines whether or not the character instructed to be input is a symbol or space. If it is determined to be a symbol or space, execution proceeds to step S405 and, if not, proceeds to step S407.

Figure 5B:
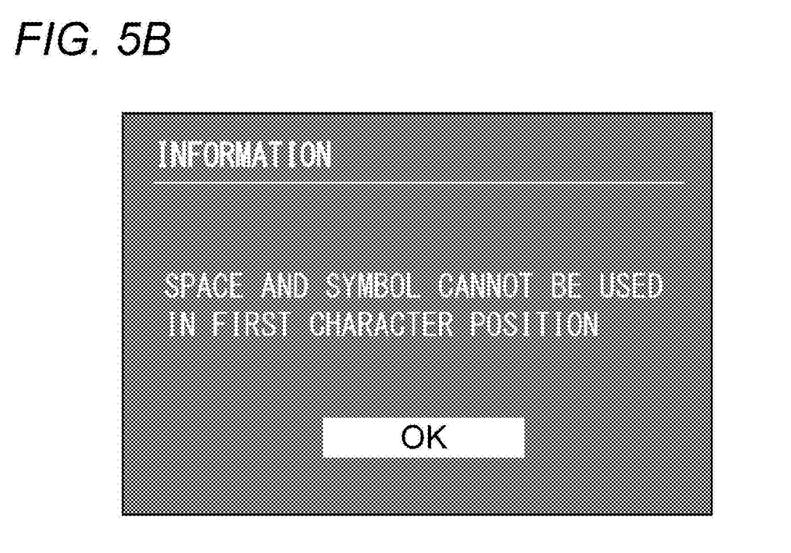

In step S405, the system control unit 50 provides, on the display unit 28, such a warning (display) as illustrated in FIG. 5B that a symbol or space cannot be input in a leading position, and proceeds to step S406.

If an OK button illustrated in FIG. 5B is pressed in step S406, the system control unit 50 proceeds to step S401 again. At this point in time, the symbol or space is not input (not displayed) in the already-input character string display field 502. In other words, a symbol or space is prohibited from being input for the first character. If the OK button is not pressed, the warning remains displayed and the screen does not return to the input screen. If execution proceeds to step S401, the character input screen illustrated in FIG. 5A is displayed on the display unit 28. The user can instruct the input of a character again. If the position in which a character has been instructed to be input corresponds to the first character position and the character instructed to be input is a symbol or space, the character instructed to be input is not input. Otherwise, the character instructed to be input is input and displayed in the already-input character string display field 502. In other words, a symbol or space can be input in a position other than the first character position by an input instruction.

On the other hand, in step S407, the system control unit 50 enables the input of the character instructed to be input. In other words, the character instructed to be input is displayed in the already-input character string display field 502. Moreover, if a character is instructed to be input in a position other than the first character position, whether or not the character is a symbol or space is not determined.

In step S408, the system control unit 50 determines whether or not the backspace key 505 has been pressed. If it is determined that the backspace key 505 has been pressed, execution proceeds to step S409 and, if not, proceeds to step S410.

In step S409, the system control unit 50 deletes a character located before the cursor. At this point in time, if the deleted character is not a character located at the end, the order of characters of the character string, the characters being located after the deleted character, is relocated by the space of the deleted character. If the first character is deleted, a character located in the second character position is changed to a character located in the first character position. Hence, a symbol or space may be displayed in the first character position in the already-input character string display field 502 due to the deletion of the character.

In step S410, the system control unit 50 determines whether or not the input position cursor key 506 has been pressed. If it is determined that the input position cursor key 506 has been pressed, execution proceeds to step S411 and, if not, proceeds to step S412.

In step S411, the system control unit 50 moves the cursor in the already-input character string display field 502 in accordance with the user's instruction. The cursor moves to the right if the input position cursor key 506 indicating the right direction is pressed, and moves to the left if the input position cursor key 506 indicating the left direction is pressed. At this point in time, if a character is input after the cursor has been moved to behind a character located in a position that is not the last, the order of characters of the character string, the characters being located after the input characters, is relocated backward by the space of the character input (added).

In step S412, the system control unit 50 determines whether or not the menu key 503 (the instruction to confirm the nickname input process) has been pressed. If it is determined that the menu key 503 has been pressed, execution proceeds to step S413 and, if not, proceeds to step S401.

In step S413, the system control unit 50 determines whether or not the first character position of the character string contains input of a symbol or space. If it is determined that the first character position of the character string contains input of a symbol or space, execution proceeds to step S405 and, if not, proceeds to step S414. If execution proceeds to step S405, a warning is issued to prevent the end of the nickname input process. At this point in time, the user instructs the input or deletion of a character such that a character located in the first character position of the character string is a character other than a symbol and space. Accordingly, the input of characters of a nickname is confirmed in step S414, and the nickname input process can be ended.

In step S414, the system control unit 50 confirms the nickname input process and returns to the wireless top menu display of step S306. If the power is subsequently turned off, the input character string is stored as a nickname in the non-volatile memory 51.

In the embodiment, the number of characters that the user can input as a nickname is specified to up to 16. 17 or more characters cannot be input.

<Wireless Settings>

The user can perform the nickname input process when establishing a first wireless connection as described above. However, settings or changes can be made also in wireless settings where the settings of wireless connection are made. A description is given of the flow of a wireless setting process according to the embodiment with reference to FIG. 6. If the menu key 503 is pressed when a screen related to the setting such as a setting screen or the character input screen is not being displayed, the menu screen of a setting menu where various settings can be made is displayed on the display unit 28. Wireless settings that allow various settings on wireless communication can be selected on the menu screen.

Figure 6:
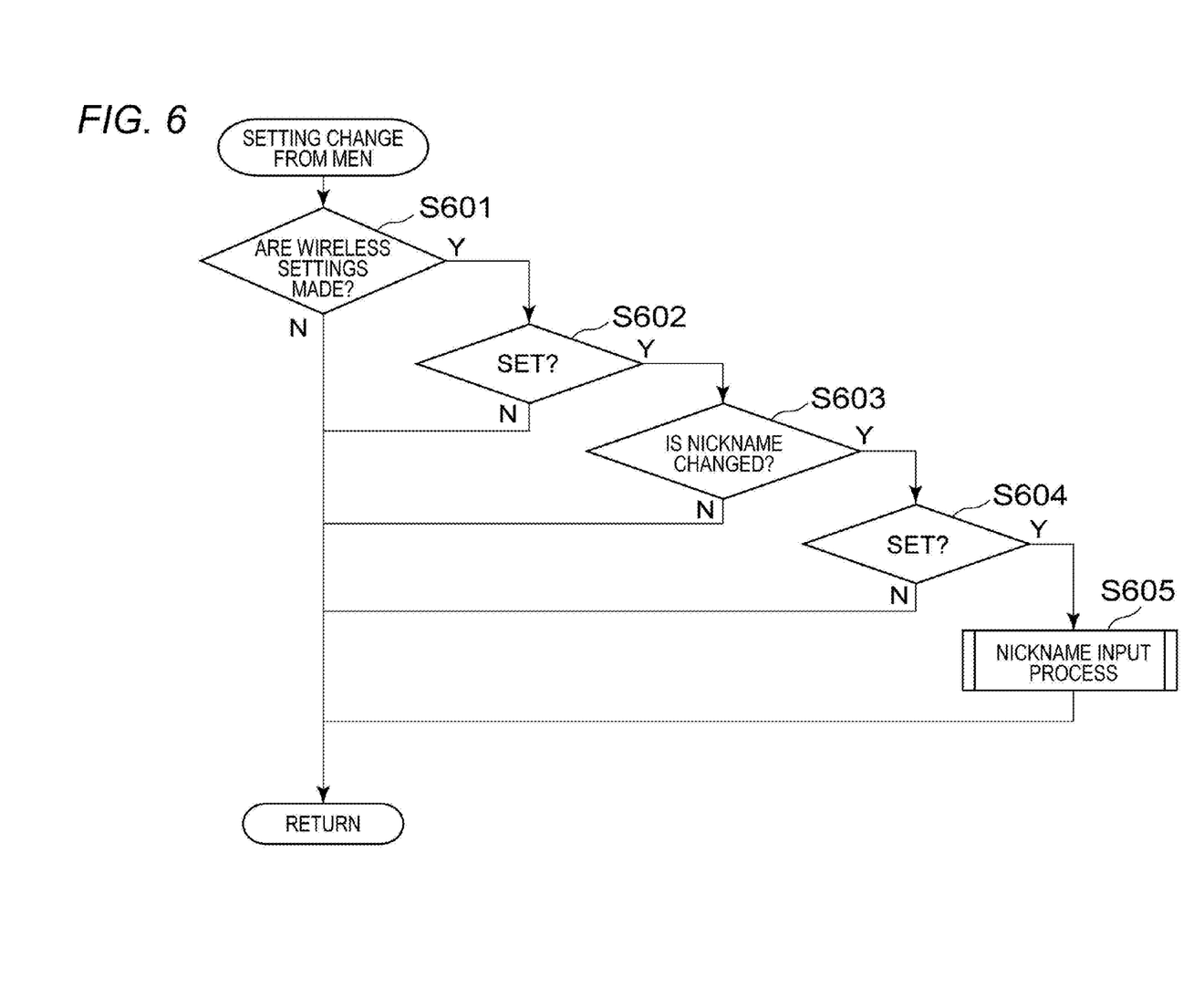
FIG. 6 is a flowchart illustrating the flow of a change of a nickname from a setting menu of the digital camera according to the embodiment.

In step S601, the system control unit 50 determines whether or not focus is on the wireless settings. If it is determined that focus is on the wireless settings, execution proceeds to step S602 and, if not, the settings on wireless communication are not made.

In step S602, the system control unit 50 determines whether or not the SET button 75 has been pressed. If it is determined that the SET button 75 has been pressed, execution proceeds to step S603 and, if not, the settings on wireless communication are not made.

In step S603, the system control unit 50 determines whether or not focus is on a change of the nickname. If it is determined that focus is on the change, execution proceeds to step S604 and, if not, the nickname input process is not performed.

In step S604, the system control unit 50 determines whether or not the SET button 75 has been pressed. If it is determined that the SET button 75 has been pressed, execution proceeds to step S605 and, if not, the nickname input process is not performed.

In step S605, the system control unit 50 proceeds to the nickname input process. The nickname input process is as described in FIG. 4.

In the embodiment, the nickname input process has been described as the setting of a nickname to be communicated with the outside by wireless communication. However, if a nickname is used when not communicating with the outside, there is no need to place a restriction on the input of a nickname. Hence, when a name is input for a face verification function that verifies the face of the user and displays the name, the system control unit 50 does not perform control of the above-mentioned nickname input process. In other words, the input of a symbol or space is enabled even for the first character.

According to the process described above, the user can input a nickname in compliance with the specification of RFC. In the embodiment, if a symbol or space is instructed to be input for the first character, the character is not input and a warning is issued. Hence, a situation becomes less likely to occur in which the nickname input process is continued with a symbol or space present in the first character position until the user finishes the character input operation. On the other hand, in terms of the last character, the position of the last character in the character string is unknown until the menu key 503 is pressed to instruct the confirmation of the nickname input process. Hence, if it is determined whether or not to be in compliance with the specification of RFC after the confirmation instruction, the user thinks a nickname and finishes the input of all the conceived characters, and then a warning is issued for the first time. Moreover, if symbols in the leading and trailing positions have been input as a set, the user returns the cursor again to the first character position and needs to rethink the nickname. Contrarily, in the embodiment, a warning is issued when the first character is input. Accordingly, the user can recognize that there is a restriction on the input of characters in compliance with the specification immediately after the start of the input of characters. Hence, according to the process of the embodiment, the user's operability improves in the nickname setting.

Moreover, while the specification of RFC states that neither of the predetermined positions of first and last characters of a character string can contain a symbol or space, only the first character is targeted for determination and characters in positions including the last character position other than the first character position are not targeted for determination. Hence, the nickname input process can be performed with few control steps in compliance with the specification of RFC.

[Second Embodiment]

Next, a second embodiment of the present invention is described. The same as the first embodiment shall apply to the second embodiment, apart from the above-mentioned flowchart of FIG. 4. In the first embodiment, it has been described that if having determined that a symbol or space had been input for the first character in step S404, the system control unit 50 issues a warning, and the symbol or space instructed to be input is not input. Contrarily, in the second embodiment, a description is given of an example where if a symbol or space is instructed for the first character, a warning is issued but the symbol or space instructed to be input is input as instructed.

Figure 7:
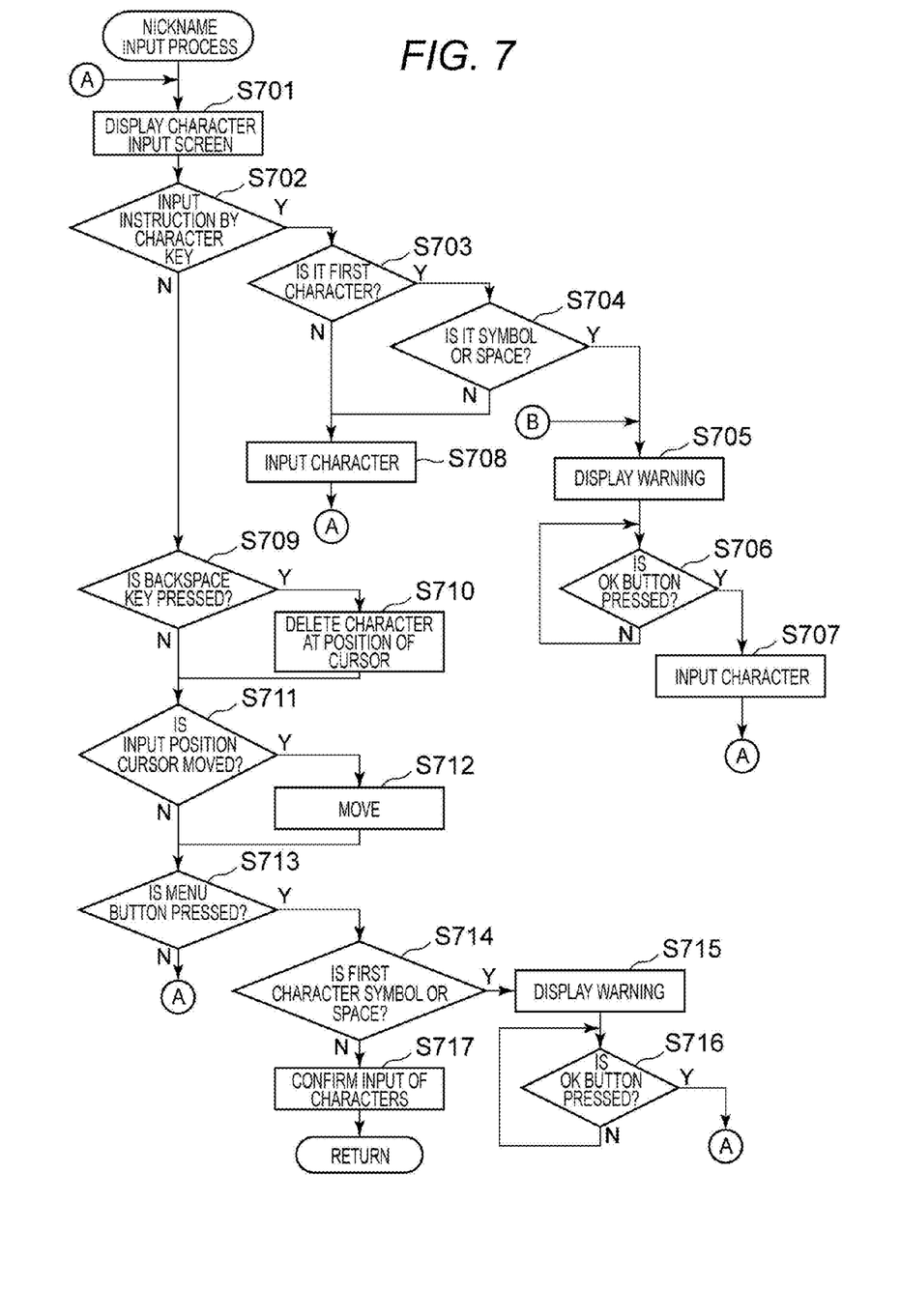
FIG. 7 is a flowchart illustrating the flow of a nickname input process according to the second embodiment.

A nickname input process in the second embodiment is described with reference to FIG. 7. The process is the detailed nickname input process in step S305 of FIG. 3 and step S605 of FIG. 6, and is an alternative to the process of FIG. 4 in the first embodiment. Moreover, the system control unit 50 executes the program stored in the non-volatile memory 51 by reading the program into the memory 18. Accordingly, the process is achieved.

Steps S701 to S706 are similar processes to steps S401 to S406.

In step S707, the system control unit 50 inputs a symbol or space instructed to be input. Execution subsequently proceeds to step S701. If execution proceeds to step S701, such a character input screen as illustrated in FIG. 5A is displayed on the display unit 28 so that the user can instruct the input of a character again.

Steps S709 to S713 are similar processes to steps S408 to S412.

In step S714, the system control unit 50 determines whether or not a symbol or space has been input for the first character of the character string. If it is determined that a symbol or space has been input for the first character of the character string, execution proceeds to step S715 and, if not, proceeds to step S718.

Steps S715 to S716 are similar processes to steps S405 to S406.

Step S717 is a similar process to step S414. At this point in time, the user instructs the input or deletion of a character to place a character other than a symbol or space in the first character position of the character string and accordingly can confirm the input of characters of a nickname in step S718.

According to the above-described process, the user can input a nickname in compliance with the specification of RFC for the nickname setting. According to the embodiment, if the user instructs the input of a symbol or space in the nickname input process, intending to use it not for the first character but for the second or later character, the character instructed to be input is input. Accordingly, the degree of flexibility of work can be increased for the user. However, it is possible to have the user recognize that a symbol or space cannot be used for the first character of a nickname upon input of the first character.

[Other Embodiments]

In the first and second embodiments, the case where a symbol or space is prohibited from being input in the plurality of predetermined positions has been described. However, the present invention can also be applied to the following case.

If the input of the same character or symbol in the plurality of predetermined positions is restricted, when an input restricted character or symbol is instructed to be input in one of the plurality of predetermined positions, the input is not accepted, or the input is accepted but a warning is issued. Alternatively, a character or symbol already input in any of the predetermined positions is compared with a character or symbol instructed to be input in the other predetermined position and, if they are the same, the input of the character or symbol in the other predetermined position is not accepted, or the input is accepted but a warning is issued. Alternatively, the user may be presented that, in response to the input of an input restricted character or symbol in any of the plurality of predetermined positions, the input of the character or symbol input in the other predetermined position is restricted. Also in the first and second embodiments, the above warning is issued to make it possible for the user to recognize the restriction of the input of characters. For example, if the same character included in the specific characters or symbols is not allowed to be input in the first and last positions of a character string, a character included in the specific characters or symbols is input in the first position of the character string, and it is then displayed that the same character is not allowed to be input at the end. Alternatively, if the same character is input, it is displayed that the input character string cannot be registered, and it is necessary to change the character input in at least one of the first and last positions.

Furthermore, the present invention can also be applied to a case where a specific combination of characters or symbols is not allowed to be input in the plurality of predetermined positions. If any of a character or symbol included in the input restricted characters or symbols is instructed to be input in any of the plurality of predetermined positions, the input is not accepted, or the input is accepted but a warning is issued. Alternatively, a character or symbol already input in any of the predetermined position is compared with a character or symbol instructed to be input in the other predetermined position and, if they make a combination of input restricted characters or symbols, the input is not accepted, or a warning is issued. When a warning is issued, it is required to present the user that a character whose input is restricted is placed in the other predetermined position, or that the character string may not be completed with the input character present in the position in which a character has been instructed to be input. Also in the first and second embodiments, the above warning is issued to make it possible for the user to recognize the restriction of the input of characters. For example, if a specific combination of characters or symbols is not allowed to be input in the first and last positions of a character string, when any of the characters included in the specific combination is input in the first position of the character string, it is displayed that the other character included in the specific combination cannot be input for the last character. Alternatively, it is displayed that a change needs to be made such that a character input in the first or last position does not make the specific combination.

A method for presenting the user that the above-mentioned has been performed (calling attention) or issuing a warning may be displaying a warning or explanation on the display unit, providing an audio warning or explanation, or simply generating a sound and presenting information to the effect that the character string cannot be registered as it is. Moreover, attention is called, or a warning is issued, during a period of time from when a first input restricted character is instructed to be input to when the next character is input, all the while until the last character is instructed to be input, periodically, or at every instruction of the input of a character. The warning method in the first and second embodiments may also be performed in the above methods.

In any case, an input restriction is imposed on or a warning is issued (attention is called) to the user to comply with the specifications before confirmation of a character string. Accordingly, the user does not need to rethink a character string in compliance with the specification after completing the character string. The combination of specific characters or symbols whose input is restricted may be a character or symbol input in any of the plurality of predetermined positions, and a character or symbol corresponding to the character or symbol. Alternatively, only when a character or symbol is input in a predetermined position, the input of a character or symbol corresponding to the character or symbol may be restricted. The method for presenting the user with characters whose input is restricted may be displaying the target characters on the keyboard in a different color from the other characters, or presenting and displaying a list of the target characters separately from the keyboard. The input of a character instructed to be input is not accepted, or a warning is issued, upon input of characters to create a character string in compliance with the specification. However, the input may not be accepted, and a warning may be further issued.

(Predetermined Positions where Input of Character is Restricted)

In the embodiment, the description has been given, assuming that if a symbol or space is allowed to be input in neither of the predetermined positions of leading and trailing positions, it is determined whether or not a character located in the first character position is a symbol or space (the specific character group). However, the number of the predetermined positions is not limited to two, but it may be a restriction that any of the specific character group is not allowed to be input in all of three or more predetermined positions. In that case, a first position out of the plurality of predetermined positions is targeted for determination. If a warning is issued upon input in the first position of the predetermined positions, the user can recognize earlier that there is a restriction on input of characters in compliance with the specification.

(Characters Whose Use is Restricted)

Moreover, the present invention can also be applied to a case where characters other than the symbols and space described as the characters whose use is restricted in the embodiments are specified as characters whose use is restricted.

(Timing for Determination)

In the embodiments, the description has given assuming that if the menu key 503 is pressed, it is determined whether or not any of the specific character group has been input in the specific position of a character string including one or a plurality of input characters. However, it may be determined whether or not a symbol or space has been input in the specific position of the character string whenever an instruction to input or delete a character is given. In this case, the process of step S413 of FIG. 4 or the processes of steps S714 to S716 of FIG. 7 are performed whenever an instruction to input or delete a character is given.

(Method for Instructing Input)

In the embodiments, the method where if it is determined that a character instructed to be input is a symbol or space, a warning is issued has been described as the method for setting a nickname in compliance with the specification of RFC. In addition, a method is also conceivable which hides or grays out a button including a character that is restricted on a position to be input in, on the nickname input screen depending on the character input position. However, the user may not know why a part of the input screen has been hidden or grayed out, and misunderstand that the hidden or grayed out character cannot be used not only in a first character position but in all positions. Moreover, the user may feel a sense of discomfort if the input screen changes depending on the position of a character instructed to be input. According to the nickname input process described in the embodiments, such issues can be solved.

In the embodiments, the description has been given of that the character input screen is displayed to instruct the input of characters. However, it may be a method in which the user handwrites a character and its corresponding character is instructed to be input. Also in the case of handwriting input, in step S404 of FIG. 4 or step S704 of FIG. 7, it is determined whether or not the character instructed by handwriting input to be input in the specific position is a symbol or space. Moreover, also in step S413 or step S714, it is determined whether or not the character instructed by handwriting input to be input in the specific position is any of the specific character group.

Moreover, in the first and second embodiments, the user can change the position of the selection frame 507 by use of the four-direction key of the cross key 74 and the controller wheel 73 when instructing the input of characters. However, when in the form of a touch panel, input can be instructed by directly touching keys on the character input screen.

(Warning Method)

In the embodiments, display is performed when a warning is issued. However, a warning may be issued by sounding out or light.

The system control unit 50 may be controlled by one piece of hardware. Alternatively, a plurality of pieces of hardware shares the processes to control the entire apparatus.

Moreover, the present invention has been described in detail based on the preferred embodiments. However, the present invention is not limited to these specific embodiments, but includes various embodiments within a scope that does not depart from the spirit of the invention. Furthermore, the above-mentioned embodiments are just illustrations of embodiments of the present invention. The embodiments can be combined as appropriate.

Moreover, in the above-mentioned embodiments, the description has been given taking an example of the case where the present invention is applied to an imaging apparatus. However, the application of the present invention is not limited to this example, but the present invention can be applied as long as it is electronic equipment having the character input function. In other words, the present invention can be applied to a personal computer, PDA, mobile phone terminal, portable image viewer, printer apparatus including a display, digital photo frame, music player, game machine, electronic book reader, and the like.

The present invention can be realized by executing the following process. In other words, it is a process of supplying software (a program) that achieves the above-mentioned functions of the embodiments to a system or apparatus via a network or various storage media, and a computer (or CPU, MPU, or the like) of the system or apparatus reading out and executing the program code. In this case, the present invention includes the program and a storage medium storing the program.

According to the present invention, operability can be improved for a user if a character is input under a restriction that any of a specific character group cannot be input in a specific position.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-272046, filed Dec. 27, 2013, which is hereby incorporated by reference herein in its entirety.

What is claimed is:

1. A character input apparatus comprising:
an instruction unit configured to instruct input of a character as a part of a character string; and
a control unit configured to, under a restriction that any character of a specific character group is not allowed to be input in every one of a plurality of predetermined positions of the character string but a character of the specific character group is allowed to be input in less than all of the predetermined positions of the character string,
prohibit input by the instruction upon any character of the specific character group being instructed by the instruction unit to be input in at least one specific position of the plurality of predetermined positions and,
enable input by the instruction upon any character of the specific character group being instructed by the instruction unit to be input in a position different from the specific position,
wherein the specific character group does not include letters and digits of a plurality of characters usable as a part of the character string;
the plurality of predetermined positions includes at least first and last character positions of the character string; and
the character string is associated with a nickname in wireless network communicating with outside and the character string to be input in compliance with a specification of Request For Comments.

2. The character input apparatus according to claim 1, wherein the control unit enables input in the specific position by the instruction upon a different character which is not a character in the specific character group being instructed to be input.

3. A character input apparatus comprising the control unit according to claim 1, wherein the specific position is a first position of the plurality of predetermined positions.

4. The character input apparatus according to claim 1, wherein the characters of the specific character grounds are predetermined symbols.

5. The character input apparatus according to claim 1, wherein the specific character group includes a space.

6. The character input apparatus according to claim 1, wherein the control unit
prohibits input by the instruction upon a character to be input being instructed as a part of a character string for communicating with the outside and upon any character of the specific character group being instructed by the instruction unit to be input in the specific position and,
enabling input by the instruction upon a character to be input being instructed as a part of a character string not for communicating with the outside and also upon
any character of the specific character group being instructed by the instruction unit to be input in the specific position.

7. The character input apparatus according to claim 1, wherein the control unit issues a warning upon any character of the already input specific character group having moved to the specific position due to deletion or addition of a character.

8. The character input apparatus according to claim 1, wherein under an instruction to confirm the input of the characters, the control unit performs control in such a manner as to
issue a warning upon any character of the specific character group being input in the specific position of the already input character string, and
not issue a warning upon a character that is not any of the characters of the specific character group being input in the specific position of the character string.

9. The character input apparatus according to claim 1, further comprising a display control unit configured to perform control in such a manner as to display an input character in response to the instruction to input a character.

10. The character input apparatus according to claim 1, wherein the control unit performs control in such a manner as to, upon any of the specific character group being instructed by the instruction unit to be input in another position different from the specific position of predetermined positions, enable input by the instruction.

11. A character input apparatus comprising:
an instruction unit configured to instruct input of a character as a part of a character string; and
a control unit configured to, under a restriction that any character of a specific character group is not allowed to be input in every one of a plurality of
predetermined positions of the character string but a character of the specific character group is allowed to be input in less than all of the predetermined positions of the character string,
issue a warning upon any character of the specific character group being instructed by the instruction unit to be input in at least one specific position of the plurality of predetermined positions except for a last position of the predetermined positions and,
enable input by the instruction upon any character of the specific character group being instructed by the instruction unit to be input in a position different from the specific position,
wherein the specific character group does not include letters and digits of a plurality of characters usable as a part of the character string;
the plurality of predetermined positions includes at least first and last character positions of the character string; and
the character string is associated with a nickname in wireless network communicating with outside and the character string to be input in compliance with a specification of Request For Comments.

12. The character input apparatus according to claim 11, wherein under the restriction, upon any of the specific character group being instructed by the instruction unit to be input in the specific position, the control unit performs control in such a manner as to prohibit input by the instruction.

13. The character input apparatus according to claim 11, wherein the warning is a warning indicating that a restriction is placed on the input of the character instructed by the instruction unit to be input in the specific position of the character string.

14. The character input apparatus according to claim 11, wherein the warning is a warning that any character of the specific character group is not allowed to be input in a position other than the specific position of the plurality of predetermined positions.

15. The character input apparatus according to claim 14, comprising:

an instruction unit configured to instruct input of a character as a part of a character string; and
a control unit configured to, under a restriction that a specific combination of characters is not allowed to be input in a plurality of predetermined positions of the character string but a character of the specific combination of characters is allowed to be input in less than all of the plurality of predetermined positions of the character string, prohibit input by the instruction upon the character included in the specific combination being instructed to be input in one specific position of the plurality of predetermined positions of the character string and,
enable input by the instruction upon any of the characters included in the specific combination being instructed by the instruction unit to be input in a position different from the specific position.

16. The character input apparatus according to claim 11, wherein the control unit performs control in such a manner as to, upon any of the specific character group being instructed by the instruction unit to be input in another position different from the specific position of predetermined positions, enable input by the instruction.

17. A character input apparatus comprising:
an instruction unit configured to instruct input of a character as a part of a character string; and
a control unit configured to, under a restriction that a specific combination of characters is not allowed to be input in a plurality of predetermined positions of the character string but a character of the specific combination of characters is allowed to be input in less than all of the plurality of predetermined positions of the character string, prohibit input by the instruction upon the character included in the specific combination being instructed to be input in one specific position of the plurality of predetermined positions of the character string and,
enable input by the instruction upon any of the characters included in the specific combination being instructed by the instruction unit to be input in a position different from the specific position,
wherein the specific character group does not include letters and digits of a plurality of characters usable as a part of the character string;
the plurality of predetermined positions includes at least first and last character positions of the character string; and
the character string is associated with a nickname in wireless network communicating with outside and the character string to be input in compliance with a specification of Request For Comments.

18. The character input apparatus according to claim 17, wherein the restriction is a restriction that, upon input of a specific character in the predetermined
position, does not allow input of a character corresponding to the specific character in the other predetermined position.

19. The character input apparatus according to claim 17, wherein the restriction is a restriction that, upon input of a specific character in the predetermined position, does not allow input of the specific character in the other predetermined position.

20. The character input apparatus according to claim 17, wherein the control unit performs control in such a manner as to, upon any of the specific character group being instructed by the instruction unit to be input in another position different from the specific position of the plurality of predetermined positions, enable input by the instruction.

21. A character input apparatus comprising:
an instruction unit configured to instruct input of a character as a part of a character string; and
a control unit configured to, under a restriction that a specific combination of characters is not allowed to be input in a plurality of predetermined positions of the character string but a character of the specific combination of characters is allowed to be input in less than all of the plurality of predetermined positions of the character string, issue a warning upon the character included in the specific combination being instructed to be input in one specific position of the plurality of predetermined positions of the character string and,
enable input by the instruction upon any of the characters included in the specific combination being instructed by the instruction unit to be input in a position different from the specific position,
wherein the specific character group does not include letters and digits of a plurality of characters usable as a part of the character string;
the plurality of predetermined positions includes at least first and last character positions of the character string; and
the character string is associated with a nickname in wireless network communicating with outside and the character string to be input in compliance with a specification of Request For Comments.

22. The character input apparatus according to claim 21, wherein the warning is a warning indicating that a restriction is placed on the input of the character instructed by the instruction unit to be input in the specific position of the character string.

23. The character input apparatus according to claim 21, wherein the warning indicates that a character making the specific combination corresponding to the character input in the specific position is not allowed to be input in a position of the plurality of predetermined positions, the position not being the specific position.

24. The character input apparatus according to claim 21, wherein the control unit performs control in such a manner as to, upon any of the specific character group being instructed by the instruction unit to be input in another position different from the specific position of the plurality of predetermined positions, enable input by the instruction.

25. A method for controlling a character input apparatus including an instruction unit to instruct input of a character as a part of a character string, the method comprising a control step of, under a restriction that any character of a specific character group is not allowed to be input in every one of a plurality of predetermined positions of the character string but a character of the specific character group is allowed to be input in less than all of the predetermined positions of the character string,
prohibiting input by the instruction upon any character of the specific character group being instructed by the instruction unit to be input in at least one specific position of the plurality of predetermined positions and,
enabling input by the instruction upon any character of the specific character group being instructed by the instruction unit to be input in a position different from the specific position,
wherein the specific character group does not include letters and digits of a plurality of characters usable as a part of the character string;

the plurality of predetermined positions includes at least first and last character positions of the character string; and the character string is associated with a nickname in wireless network communicating with outside and the character string to be input in compliance with a specification of Request For Comments.

26. A non-transitory computer readable storage medium storing a program to execute the method according to claim 25.

27. A method for controlling a character input apparatus including an instruction unit to instruct input of a character as a part of a character string, the method comprising a control step of, under a restriction that any character of a specific character group is not allowed to be input in every one of a plurality of predetermined positions of the character string but a character of the specific character group is allowed to be input in less than all of the predetermined positions of the character string, issuing a warning upon any character of the specific character group being instructed by the instruction unit to be input in at least one specific position of the plurality of predetermined positions except for a last position of the predetermined positions and, enabling input by the instruction upon any character of the specific character group being instructed by the instruction unit to be input in a position different from the specific position, wherein the specific character group does not include letters and digits of a plurality of characters usable as a part of the character string;

the plurality of predetermined positions includes at least first and last character positions of the character string; and the character string is associated with a nickname in wireless network communicating with outside and the character string to be input in compliance with a specification of Request For Comments.

28. A non-transitory computer readable storage medium storing a program to execute the method according to claim 27.

29. A method for controlling a character input apparatus including an instruction unit to instruct input of a character as a part of a character string, the method comprising a control step of, under a restriction that a specific combination of characters is not allowed to be input in a plurality of predetermined positions of the character string but a character of the specific combination of characters is allowed to be input in less than all of the plurality of predetermined positions of the character string, prohibit input by the instruction upon the character included in the specific combination being instructed to be input in one specific position of the plurality of predetermined positions of the character string and, enable input by the instruction upon any of the characters included in the specific combination being instructed by the instruction unit to be input in a position different from the specific position, wherein the specific character group does not include letters and digits of a plurality of characters usable as a part of the character string;

the plurality of predetermined positions includes at least first and last character positions of the character string; and the character string is associated with a nickname in wireless network communicating with outside and the character string to be input in compliance with a specification of Request For Comments.

30. A method for controlling a character input apparatus including an instruction unit to instruct input of a character as a part of a character string, the method comprising a control step of, under a restriction that a specific combination of characters is not allowed to be input in a plurality of predetermined positions of the character string but a character of the specific combination of characters is allowed to be input in less than all of the plurality of predetermined positions of the character string, issue a warning upon the character included in the specific combination being instructed to be input in one specific position of the plurality of predetermined positions of the character string and, enable input by the instruction upon any of the characters included in the specific combination being instructed by the instruction unit to be input in a position different from the specific position, wherein the specific character group does not include letters and digits of a plurality of characters usable as a part of the character string;

the plurality of predetermined positions includes at least first and last character positions of the character string; and the character string is associated with a nickname in wireless network communicating with outside and the character string to be input in compliance with a specification of Request For Comments.

\* \* \* \* \*